US012715330B2

(12) United States Patent
Poli et al.

(10) Patent No.: US 12,715,330 B2
(45) Date of Patent: Aug. 25, 2026

(54) METHOD AND CIRCUIT FOR PROTECTING AN ON-BOARD CHARGING DEVICE

(71) Applicants: ELDOR CORPORATION S.P.A., Orsenigo (IT); DR. ING. H.C.F. PORSCHE AG, Stuttgart (DE)

(72) Inventors: Alessandro Poli, Orsenigo (IT); Francesco Bertino, Orsenigo (IT); Pasquale Forte, Orsenigo (IT)

(73) Assignee: BORGWARNER ORSENIGO S.R.L., Orsenigo (IT)

( * ) Notice: Subject to any disclaimer, the term of this patent is extended or adjusted under 35 U.S.C. 154(b) by 578 days.

(21) Appl. No.: 18/258,593

(22) PCT Filed: Dec. 16, 2021

(86) PCT No.: PCT/IB2021/061823

§ 371 (c)(1),
(2) Date: Jun. 21, 2023

(87) PCT Pub. No.: WO2022/137035

PCT Pub. Date: Jun. 30, 2022

(65) Prior Publication Data

US 2024/0042884 A1 Feb. 8, 2024

(30) Foreign Application Priority Data

Dec. 21, 2020 (IT) ........................ 102020000031664

(51) Int. Cl.
*B60L 3/00* (2019.01)
*B60L 53/22* (2019.01)
(Continued)

(52) U.S. Cl.
CPC ............. *B60L 53/62* (2019.02); *B60L 3/0046* (2013.01); *B60L 53/22* (2019.02); *H02J 7/62* (2026.01); *H02J 2207/20* (2020.01)

(58) Field of Classification Search
USPC ......... 320/106, 107, 108, 109, 110, 111, 112
See application file for complete search history.

(56) References Cited

U.S. PATENT DOCUMENTS

2011/0216451 A1* 9/2011 Haines .................. H02H 3/338 361/93.6
2014/0300274 A1* 10/2014 Acatrinei ........... H05B 45/3578 315/122

(Continued)

FOREIGN PATENT DOCUMENTS

EP 2741390 A1 6/2014
EP 3136115 A1 3/2017

OTHER PUBLICATIONS

International Search Report and Written Opinion dated Mar. 7, 2022 from counterpart International Patent Application No. PCT/IB2021/061823.

*Primary Examiner* — Brian Ngo
(74) *Attorney, Agent, or Firm* — SHUTTLEWORTH & INGERSOLL, PLC; Timothy J. Klima

(57) ABSTRACT

A method for protecting an on-board charging device includes the steps of detecting the phase and neutral voltages coming from the grid, detecting a current signal representing a compensation current generated by a compensation circuit, combining the phase voltages together so as to obtain a homopolar voltage signal, squaring the current signal and the homopolar voltage signal so as to obtain a first square current wave and a second square voltage wave, combining the first and second square waves together so as to generate an output signal having a first logic level when the first and second square waves are in phase and a second logic level when the first and second square waves are out of phase, generating a voltage increasing in proportion to the duration of each section of the output signal having the first value, comparing the voltage value with a limit value and gener- (Continued)

Figure 1:
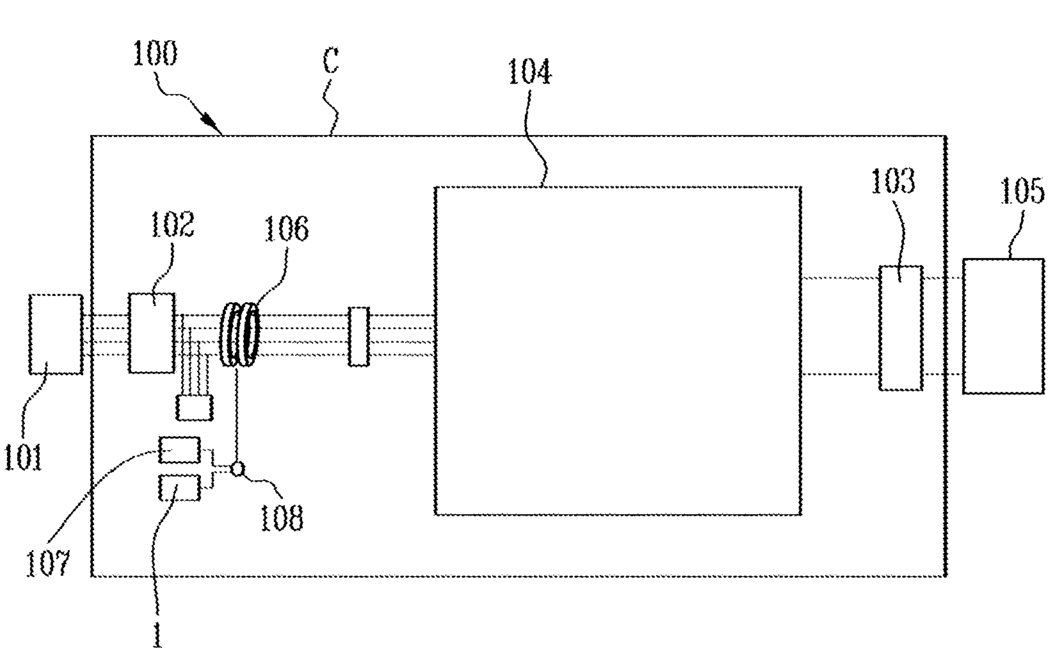

ating an alarm signal when the voltage level exceeds the limit value.

10 Claims, 1 Drawing Sheet

(51) Int. Cl.
*B60L 53/62* (2019.01)
*H02J 7/62* (2026.01)

(56) References Cited

U.S. PATENT DOCUMENTS

2018/0011135 A1 1/2018 Aebersold
2024/0332946 A1 * 10/2024 Eriksen ................ H02H 1/0015

* cited by examiner

100
C
104
102
106
103
105
101
107
108
1

1
2
4
3
6
10
L1
L2
L3
N
0
0
Icomp
5
7
9

METHOD AND CIRCUIT FOR PROTECTING AN ON-BOARD CHARGING DEVICE

This application is the National Phase of International Application PCT/IB2021/061823 filed Dec. 16, 2021 which designated the U.S.

This application claims priority to Italian Patent Application No. 102020000031664 filed Dec. 21, 2020, which applications are incorporated by reference herein.

The present invention relates to a method and a circuit for protecting an on-board charging device.

Therefore, the present invention finds its main application in the automotive field, in particular in the design and construction of charging systems for on-board electric batteries.

In the field of electric vehicles, in fact, the battery pack charging mode is divided into two distinct respective macro-categories: on-board chargers and ground chargers.

The "on-board chargers", as the name suggests, are built into the vehicle and include all the power and control electronics needed to convert the alternating current from the grid into direct current required to recharge the battery pack.

On the other hand, the "ground" chargers are the usual "columns" or wallboxes which operate the conversion directly by supplying direct current to the vehicle.

It therefore appears that battery chargers of the on-board type, since they have to manage an alternating current coming from the grid and convert it into direct current for recharging high-voltage batteries, show greater criticality from the user's safety point of view, and must be equipped with suitable protection systems.

This is even more crucial in the construction of on-board charging systems of the non-insulated type, in which the battery charger has a direct electrical connection for the outlet of the alternating current wiring, thus defining a true mesh capable of closing the circuit to earth.

Within these types of battery chargers, the problem has emerged of compensating for the leakage currents that are created because of the continuous switches of the electronic components inside the converter block, which actually change the voltage of the battery capacitors, and consequently generate a current leakage to earth.

Within a three-phase system, these currents reach amplitude levels higher than 100 mA RMS, more frequently close to 150 mA RMS, which makes it necessary to compensate for it in order to avoid the intervention of circuit breakers or differential switches.

For this reason, a compensation circuit configured to generate a current equal and opposite to that flowing to earth through the battery capacitors has been inserted inside the charging device.

Disadvantageously, this has introduced a considerable safety problem linked to the possibility that the compensation circuit can also intervene in the presence of a loss of insulation between the battery charger and the vehicle chassis, in fact "deceiving" the differential switches and preventing them from coming into operation.

In order to overcome this drawback, software systems have been developed, which are managed by means of a microcontroller and are capable of discriminating between the cases in which the current flowing in the system is of the capacitive type, therefore flowing through the capacitors and hence to be compensated for, and the cases in which the current is of the resistive type, therefore dangerous (i.e., flowing through the human body or another resistance).

Since these are safety systems that are of critical importance in electric vehicles, however, the Applicant found that the presence of a purely software level of safety in such a critical point of the system could be insufficient.

Therefore, it is an object of the present invention to provide a method and a circuit for protecting an on-board charging device, which are capable of overcoming the above-mentioned drawbacks of the prior art.

In particular, it is an object of the present invention to provide a method and a circuit for protecting an on-board charging device, which are highly reliable and simple to implement or produce.

Said objects are achieved by means of a method and a circuit for protecting an on-board charging device having the features of one or more of the ensuing claims.

In particular, the method comprises detecting the phase and neutral voltages coming from the grid and detecting a current signal representing said compensation current generated by a compensation circuit.

Preferably, the phase voltages are thus combined so as to obtain a homopolar voltage signal.

Preferably, the current signal and the homopolar voltage signal are squared so as to obtain a first square current wave and a second square voltage wave.

Preferably, the first and second square waves are combined so as to generate an output signal having a first logic level when said first and second square waves are in phase and a second logic level when said first and second square waves are out of phase.

Preferably, a first voltage increasing in proportion to the duration of each section of the output signal having said first value is therefore generated.

The value of said first voltage is compared with a limit value and an alarm signal is generated when said value of said first voltage exceeds said limit value.

A further object of the present invention is a circuit for protecting the charging device.

The circuit comprises a summing network configured to receive, as input, signals representing the phase and neutral voltages of the grid and to return, as output, a homopolar voltage signal.

There is preferably provided an element for detecting a current signal representing the compensation current.

Furthermore, there is preferably provided a conversion stage configured to receive as input said homopolar voltage signal and said current signal and to generate a first square wave representative of said homopolar voltage signal and a second square wave representative of said current signal.

A combining stage is located downstream of the conversion stage and is configured to combine the first and second square waves together so as to generate an output signal having a first logic level when said first and second square waves are in phase and a second logic level when said first and second square waves are out of phase.

A charging module (or charger) is also preferably provided and operationally arranged downstream of the combining stage, and configured to generate a first voltage increasing in proportion to the duration of each section of the output signal having said first value.

A comparator element is preferably associated with the charging module and configured to compare the value of said first voltage with a limit value and to generate an alarm signal if the value of said first voltage exceeds said limit value.

The dependent claims, hereby incorporated by reference, correspond to different embodiments of the invention.

Figure 2:
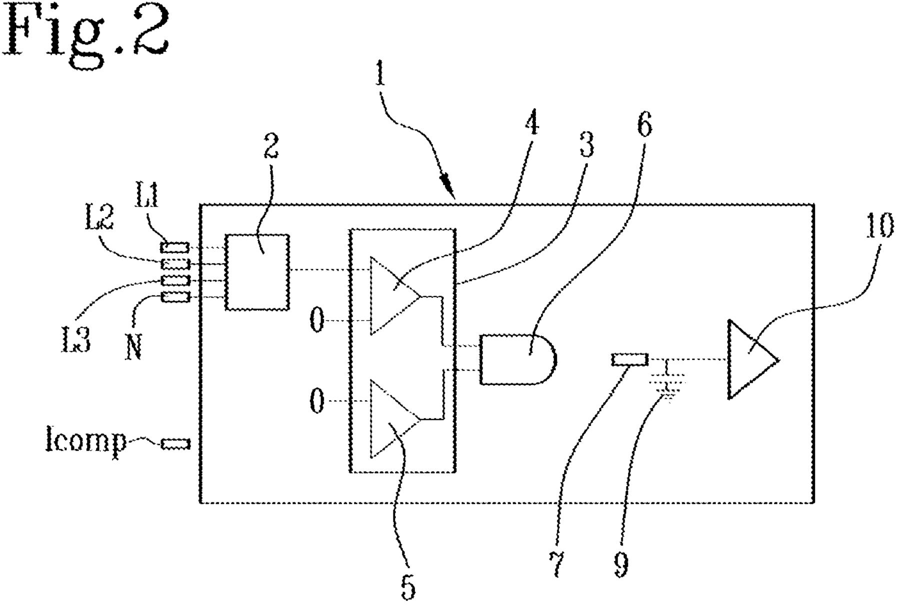

Further features and advantages of the present invention will become more apparent from the indicative, and therefore non-limiting description of a preferred, but not exclusive, embodiment of a method and a circuit for protecting an on-board charging device, as illustrated in the accompanying figures, wherein:

FIG. 1 schematically shows the structure of an on-board charging device;

FIG. 2 schematically shows the structure of a circuit for protecting an on-board charging device according to the present invention.

With reference to the accompanying figures, reference numeral 1 generally designates a circuit for protecting an on-board charging device 100 in accordance with the present invention.

The term on-board charging device 100 herein is intended to generally define any charging system for a traction battery pack 6 able to connect to the AC grid, converting it into direct current before powering the battery. Preferably, the grid is of the three-phase type.

For this reason, the charging device 100 comprises at least one casing C (connected to earth) associated with a connection socket 101 for connection to the grid G and containing a converter assembly 104 configured to convert the alternating current coming from the grid G into a direct current that can be used for recharging the battery pack 105.

The connection socket 101 is therefore configured to receive both the three phases L1, L2, L3 and the neutral N.

Preferably, the charging device 100 further comprises at least one electromagnetic disturbance filtering element arranged along a current input line, i.e., between the connection socket 101 and the converter assembly 104.

More preferably, the electromagnetic disturbance filtering elements are two, a first one 102 along the (alternating) current input line and a second one 103 along a (direct) current output line, i.e., between the converter assembly 104 and the battery pack 105.

In the preferred embodiment, the charging device 100 is of the non-insulated type, i.e., it provides a physical (i.e., non-inductive) connection between the battery and the distribution system.

Preferably, in this type of device 100 the converter assembly 104 comprises at least one boost module and at least one buck module.

In the preferred embodiment, the converter assembly 104 comprises:

- a first conversion stage (or AC-DC converter) configured to convert the alternating current coming from the grid G into direct current;
- a charging stage, preferably defined by a capacitor bank, operatively arranged downstream of the first conversion stage and configured to be charged by receiving its output;
- a second conversion stage (or DC-DC converter) configured to modulate the level of direct current sent to the battery pack 105.

In the preferred embodiment, as stated, the charging device 100 is of the non-insulated type, therefore the second conversion stage is connected directly to the battery pack (i.e., without the conversion/inductive stage).

Furthermore, the charging device 100 preferably comprises a compensation circuit 106 configured to generate a compensation current equal and opposite to the leakage currents flowing towards earth PE.

In order to avoid the safety problems described in the introduction, the charging device 100 could comprise a microcontroller provided with a protection module 107 configured to generate an alarm signal if a relevant resistive component is detected within said leakage currents.

Alternatively, or jointly, the charging device is associated with a protection circuit 1 in accordance with the invention.

The protection circuit 1 is therefore preferably arranged to receive, as input, signals representing the phase and neutral voltages of the grid G and a current signal representing the compensation current and configured to generate, as output, an alarm signal if a relevant resistive component is detected within said leakage currents.

In greater detail, the protection circuit 1 comprises a summing network 2 configured to receive, as input, the signals representing the phase and neutral voltages of the grid G and to return, as output, a homopolar voltage signal.

The term "homopolar voltage" herein is intended to mean that the voltage of the real star point of the three-phase system with respect to the ideal one coincides with the centre of gravity of the triangle of the line voltages.

There is also provided an element for detecting a current signal Icomp representing the compensation current.

These signals, i.e., the current signal and the homopolar voltage signal, are then injected into a conversion stage X.

The conversion stage 3 is preferably configured to receive as input said homopolar voltage signal and said current signal and to generate a first square wave representing said homopolar voltage signal and a second square wave representing said current signal.

Preferably, the conversion stage 3 comprises a first 4 and a second conversion module 5 (or transformer) configured to generate the first and second square waves, respectively.

In the preferred embodiment, the first 4 and the second conversion module 5 are each defined by a comparator.

Said comparator is configured to receive as input the respective homopolar voltage signal or current signal and to generate a square wave representing the sign of said signal.

In other words, the comparator is configured to compare the input signal with a null reference and to output a signal with a value of 1 in the event of a positive sign and with a value of 0 in the event of a negative sign of the input signal (or vice versa).

The electronic protection circuit 1 further comprises a combining stage 6 configured for combining the first and second square waves together so as to generate an output signal having a first logic level when said first and second square waves are in phase and a second logic level when said first and second square waves are out of phase.

In other words, the combining stage 6 is configured to generate a signal representing the phase shift between the first and the second square wave, returning the first logic level in the time intervals in which the two waves are in phase (that is, when the current signal and the homopolar voltage signal have the same sign) and a second logic level in the time intervals in which the two waves are out of phase (that is, when the current signal and the homopolar voltage signal have different signs).

In the preferred embodiment, the combining stage 6 is at least partly defined by a multiplier that returns a value of 1 only when the two square waves overlap.

There is also provided a charging module 7 operationally arranged downstream of the combining stage 6.

This charging module 7 is configured to generate a first voltage increasing in proportion to the duration of each section of the output signal having said first value.

In other words, the first voltage generated by the charging module 7 is proportional to the duration of the overlap between the first and the second square wave, thus defining a precise indicator of the phase shift between the homopolar voltage signal and the current signal.

Preferably, the charging module is defined by an RC circuit, having a resistor 8 and a capacitor 9 in series with each other.

The protection circuit 1 then comprises a comparator element 10 configured to compare the value of said first voltage with a limit value and to generate an alarm signal if the voltage level of said capacitor exceeds said limit value.

The value of the first voltage is proportional to the time constant of the RC circuit and to the tolerable phasing level between the two input signals.

In the preferred embodiment, the time constant is equal to 2.2 ms and the limit value of the first voltage is reached in about 9 ms.

In the preferred embodiment, the protection circuit 1 is placed in parallel (i.e., redundant) with the protection module 107 of the microcontroller.

Advantageously, in this way it is possible to have two levels of safety independent of each other and therefore to increase the reliability of the system.

Preferably, in this regard, the charging device 100 comprises at least one enabling node (108) joined to the module 107 and the protection circuit 1 and configured to generate an enabling signal for said compensation circuit 106 only in the absence of alarm signals generated by the module 107 and the protection circuit 1.

A further object of the present invention is a method for protecting the on-board charging device 100, preferably but not necessarily implemented by means of the protection circuit 1 according to the present invention and described heretofore.

The method will therefore be described in greater detail below, stressing straight away that all the features mentioned and described in relation to the circuit 1, where not expressly indicated or in case of incompatibility, are to be considered applicable mutatis mutandis to the following description of the method object of the present invention.

The method comprises detecting the phase and neutral voltages coming from the grid G and detecting a current signal representing said compensation current generated by the compensation circuit.

The phase voltages are therefore combined together so as to obtain a homopolar voltage signal.

The current signal and the homopolar voltage signal are thus squared so as to obtain a first square current wave and a second square voltage wave.

In greater detail, the square waves actually define the sign of the input signals.

The first and the second square wave are thus combined together so as to generate an output signal having a first logic level when said first and second square waves are in phase and a second logic level when said first and second square waves are out of phase.

Preferably, the first and the second square wave are multiplied by each other. The first logic level is equal to 1, since the multiplication provides a value of 1 in case of overlap between the two square waves; the second logic level is equal to 0.

Advantageously, in this way it is possible to obtain an easily interpretable signal that provides precise information about the phase shift between the current signal and the homopolar voltage signal.

The phase shift degree is in fact proportional to the duration of the overlap intervals, therefore to the duration of the output signal sections having the first logic value.

A first voltage increasing in proportion to the duration of each section of the output signal having said first value is generated at this point.

Said step of generating the first voltage is carried out by charging a capacitor, preferably located in an RC circuit similar to the one described above.

The value of said first voltage is therefore compared with a limit value and an alarm signal is generated when the level of said first voltage of said capacitor exceeds said limit value.

A step of disabling the compensation circuit 106 is therefore provided following the generation of said alarm signal.

The invention achieves the intended objects and offers important advantages.

In fact, the use of a completely physical/hardware protection method and circuit allows the reliability of the protection system to be increased.

The invention claimed is:

1. A method for protecting an on-board charging device, wherein said charging device comprises a socket for connection to a grid and a converter assembly configured to convert an alternating current coming from the grid into a direct current usable for charging a battery pack and a compensation circuit configured to generate a compensation current equal and opposite to one or more leakage currents flowing towards earth; said method comprising the following steps:

detecting phase and neutral voltages coming from the grid;

detecting a current signal representing said compensation current generated by the compensation circuit;

combining said phase voltages to obtain a homopolar voltage signal;

squaring said current signal and homopolar voltage signal to obtain a first square current wave and a second square voltage wave;

combining the first and second square waves to generate an output signal having a first logic level when said first square current wave and second square voltage wave are in phase and a second logic level when said first square current wave and second square voltage wave are out of phase;

generating a first voltage increasing proportionally to a duration of each section of the output signal having said first value;

comparing a value of said first voltage with a limit value;

generating an alarm signal when said value of the first voltage exceeds said limit value.

2. The method according to claim 1, wherein said step of combining the first square current wave and second square voltage wave involves multiplying said first square current wave and second square voltage wave together.

3. The method according to claim 1, wherein said step of generating the first voltage is carried out by charging a capacitor.

4. The method according to claim 1, comprising a step of disabling said compensation circuit following the generation of said alarm signal.

5. A circuit for protecting an on-board charging device, wherein said charging device comprises a socket for connection to a grid and a converter assembly configured to convert an alternating current coming from the grid into a direct current usable for charging a battery pack and a compensation circuit configured to generate a compensation current equal and opposite to one or more leakage currents flowing towards earth; said device comprising:

a summing network configured to receive as input signals representing the phase and neutral voltages of the grid and to generate as output a homopolar voltage signal;

an element for detecting a current signal representing the compensation current;

a conversion stage configured to receive as input said homopolar voltage signal and said current signal and to generate a first square wave representative of said homopolar voltage signal and a second square wave representative of said current signal;

a combining stage configured for combining the first and second square waves to generate an output signal having a first logic level when said first and second square waves are in phase and a second logic level when said first and second square waves are out of phase;

a charging module operationally arranged downstream of the combining stage (6) and configured to generate a first voltage increasing in proportion to a duration of each section of the output signal having said first value;

a comparator element configured to compare the value of said first voltage with a limit value and to generate an alarm signal if the value of said first voltage exceeds said limit value.

6. The circuit according to claim 5, wherein said conversion stage comprises a first and a second conversion module configured to generate the first and second square waves, respectively.

7. The circuit according to claim 6, wherein the first and the second conversion module are each defined by a comparator configured to receive as input the respective homopolar voltage signal or current signal and to generate the square wave representing the sign of said signal.

8. The circuit according to claim 5, wherein the combining stage is at least partially defined by a multiplier.

9. The circuit according to claim 5, wherein the charging module is defined by a circuit having a resistor and a capacitor in series with each other.

10. An on-board charging device comprising:

a socket for connection to the grid;

a converter assembly configured to convert the alternating current coming from the grid into a direct current usable for recharging the battery pack;

a compensation circuit configured to generate a compensation current equal and opposite to the leakage currents flowing towards earth;

a microcontroller provided with a protection module configured to generate an alarm signal if a relevant resistive component is detected within said leakage currents;

a protection circuit according to claim 5 arranged in parallel with said protection module;

at least one enabling node joined to said module and protection circuit and configured to generate an enabling signal for said compensation circuit only in the absence of alarm signals generated by the module and by the protection circuit.

* * * * *